US008179439B2

(12) United States Patent
Resch et al.

(10) Patent No.: US 8,179,439 B2
(45) Date of Patent: May 15, 2012

(54) SECURITY SYSTEM

(76) Inventors: Christopher T. Resch, Birnamwood, WI (US); Amy R. Resch, Birnamwood, WI (US)

( * ) Notice: Subject to any disclaimer, the term of this patent is extended or adjusted under 35 U.S.C. 154(b) by 1226 days.

(21) Appl. No.: 11/853,922

(22) Filed: Sep. 12, 2007

(65) Prior Publication Data
US 2009/0066794 A1    Mar. 12, 2009

(51) Int. Cl.
*H04N 7/18*    (2006.01)
*G08B 13/00*    (2006.01)

(52) U.S. Cl. ........ 348/155; 348/143; 348/144; 348/145; 348/146; 348/147; 348/148; 348/149; 348/150; 348/151; 348/152; 348/153; 348/154; 348/156; 348/157; 348/158; 348/159; 340/541

(58) Field of Classification Search .......... 348/155
See application file for complete search history.

(56) References Cited

U.S. PATENT DOCUMENTS

| | | | | |
|---|---|---|---|---|
| 5,164,827 A * | 11/1992 | Paff | ............................... | 348/143 |
| 5,382,943 A * | 1/1995 | Tanaka | ..................... | 340/539.22 |
| 6,709,172 B2 * | 3/2004 | Brown | ......................... | 396/427 |
| 6,803,945 B1 * | 10/2004 | Needham | ................... | 348/207.1 |
| 7,023,913 B1 * | 4/2006 | Monroe | ................... | 375/240.01 |
| 7,109,860 B2 | 9/2006 | Wang | | |
| 7,184,785 B2 | 2/2007 | Balley et al. | | |
| 7,271,830 B2 * | 9/2007 | Robins et al. | ............... | 348/208.6 |
| 7,796,154 B2 * | 9/2010 | Senior et al. | ................... | 348/154 |
| 7,937,167 B1 * | 5/2011 | Mesarina et al. | ............... | 700/78 |
| 2003/0025599 A1 * | 2/2003 | Monroe | ......................... | 340/531 |
| 2003/0141972 A1 * | 7/2003 | Yang et al. | ..................... | 340/531 |
| 2004/0150713 A1 | 8/2004 | Cheng | | |
| 2004/0198313 A1 * | 10/2004 | Chiu | .......................... | 455/404.1 |
| 2004/0252197 A1 * | 12/2004 | Fraley et al. | ............... | 348/207.1 |
| 2008/0129498 A1 * | 6/2008 | Howarter et al. | ............ | 340/541 |

FOREIGN PATENT DOCUMENTS
JP     2001292442     10/2001
* cited by examiner

*Primary Examiner* — Douglas B Blair
*Assistant Examiner* — Angela Nguyen
(74) *Attorney, Agent, or Firm* — Dale J. Ream

(57) ABSTRACT

A security system includes at least first and second monitoring units, each having a motion sensor for detecting motion, a camera for obtaining visual data, a transmitter, a receiver, and a processor in data communication with the motion sensor, camera, transmitter, and receiver. The security system includes means for outputting visual data from the first unit camera when the first unit motion sensor detects motion more recently than the second unit motion sensor detects motion. The security system includes programming for outputting the visual data from the second unit camera when the second unit motion sensor detects motion more recently than the first unit motion sensor detects motion. The system includes a telephone interface for transmitting visual data captured by a respective camera. A unit's camera is only activated when its associated motion detector detects motion and is deactivated when another unit's motion detector detects motion more recently.

3 Claims, 5 Drawing Sheets

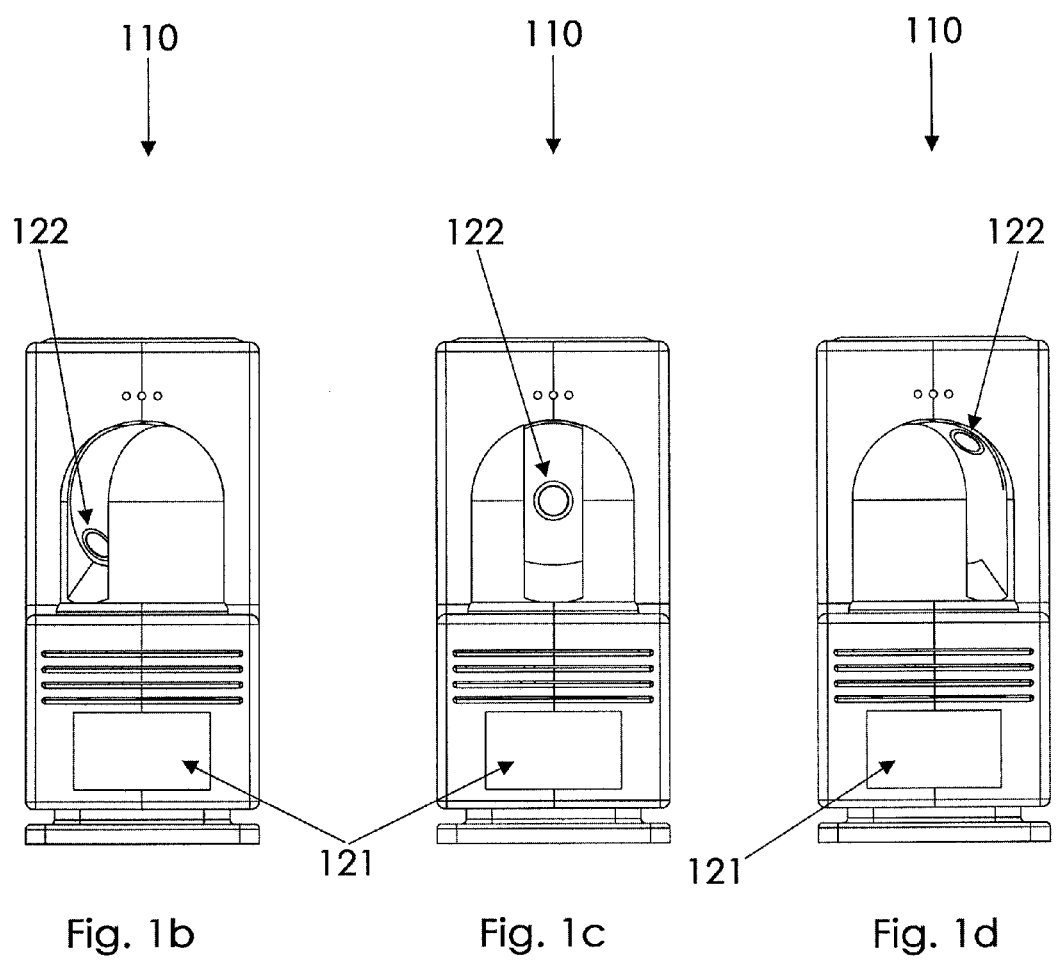

SECURITY SYSTEM

BACKGROUND OF THE INVENTION

This invention relates generally to security systems and, more particularly, to a security system having multiple units that can detect intrusion with each unit having a camera for capturing video at the unit where motion was most recently detected.

In modern times, many people are nervous about their houses, loved ones, and possessions are safe from intruders while they are away from home. The thought of returning home to find their home has been broken into, their possessions stolen, or their loved ones harmed is a disturbing and recurring worry. In addition, it is frequently difficult for law enforcement authorities to ever catch the criminals who may have broken into someone's home in that there are no pictures, photographs, or other evidence of the identity of the perpetrators.

Various devices have been proposed in the art for detecting an intrusion, such as motion detectors, glass breakage sensors, etc. Further, existing security systems may alert authorities regarding the intrusion, such as by immediately dialing an emergency number like 911. In addition, existing security systems may include cameras that record all of the time or at predetermined intervals of time. Although assumably effective for their intended purposes, the existing proposals and products do not provide a system that is both effective in detecting an intrusion or other predetermined events, is cost effective by only activating its cameras in areas where motion is most recently detected, and notifies a predetermined person(s) when an intrusion is detected, and can send real-time video via telephone at locations where motion is detected.

Therefore, it would be desirable to have a security system that satisfies the shortcomings of existing proposals and products listed above.

SUMMARY OF THE INVENTION

Accordingly, a security system according to the present invention includes first and second monitoring units, each having a motion sensor for detecting motion, a camera for obtaining visual data, a transmitter, a receiver, and a processor in data communication with the motion sensor, camera, transmitter, and receiver. The security system further includes means for outputting the visual data from the first unit camera when the first unit motion sensor detects motion more recently than the second unit motion sensor detects motion. Further, the security system further includes means for outputting the visual data from the second unit camera when the second unit motion sensor detects motion more recently than the first unit motion sensor detects motion.

The security system includes a telephone interface in data communication with the first unit processor. Outputting visual data includes actuating the telephone interface to send the visual data to a telephone. The means for outputting includes programming in the first unit processor for actuating the first unit camera when the first unit motion sensor detects motion and programming for actuating the telephone interface to send the visual data from the first unit camera. The second unit processor includes similar programming except that visual data is sent from the second unit camera to the first unit receiver. In this way, visual data from respective camera may be transmitted to a user's telephone or to law enforcement authorities.

The first unit processor transmits an event signal when its motion detector detects motion. The second processor similarly transmits an event signal when its motion detector detects motion. Further, the first unit processor deactivates its camera when it receives an event signal from the second unit processor. In this way, the security system tracks an intruder from one location to another, activating appropriate units to capture visual data wherever the intruder is located.

Each unit also includes an environmental hazard detector in data communication with a respective processor. An alarm is also in data communication with the processor and the processor includes programming for actuating a respective alarm when respective environmental detector senses a hazard.

Therefore, a general object of this invention is to provide a security system that detects intrusion into a home or other defined area and to capture visual data regarding the intrusion event.

Another object of this invention is to provide a security system, as aforesaid, having multiple monitoring units, each having a motion detector and camera.

Still another object of this invention is to provide a security system, as aforesaid, in which a respective monitoring unit camera is actuated to record visual data when its associated motion detector detects motion.

Yet another object of this invention is to provide a security system, as aforesaid, in which a monitoring unit camera is deactivated when another monitoring unit detects motion more recently than its own motion detector.

A further object of this invention is to provide a security system, as aforesaid, having a telephone interface such that visual data from a camera may be transmitted.

A still further object of this invention is to provide a security system, as aforesaid, having environmental detectors for alerting a user of an environmental hazard.

Other objects and advantages of the present invention will become apparent from the following description taken in connection with the accompanying drawings, wherein is set forth by way of illustration and example, embodiments of this invention.

BRIEF DESCRIPTION OF THE DRAWINGS

FIGS. 1b, 1c, and 1d are front views of the monitoring unit as in FIG. 1a with the camera in different orientations;

FIG. 2 is an exploded view of the monitoring unit as in FIG. 1a;

DESCRIPTION OF THE PREFERRED EMBODIMENT

A security system 100 according to the present invention will now be described in detail with reference to FIGS. 1a through 4 of the accompanying drawings. More particularly, according to the current invention, a security system 100 includes a plurality of monitoring units 110.

While one monitoring unit 110 (referred to herein as the first monitoring unit) has different features than all other monitoring units 110 (respectively referred to herein as the second monitoring unit), only one monitoring unit 110 is shown in detail in the accompanying drawings. Differences between monitoring units 110 are discussed in detail below where relevant. Although the first and second monitoring units are described in detail, it should be understood that the security system 100 may include a plurality of monitoring units having a substantially similar construction.

Figure 1A:
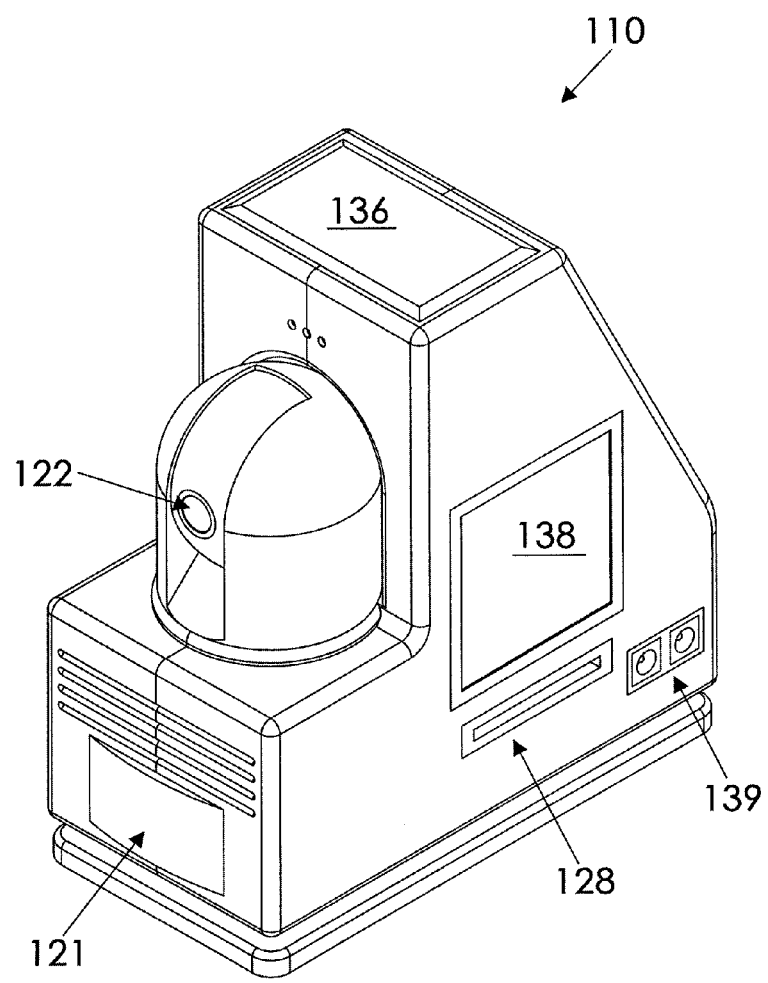
FIG. 1a is a perspective view of a monitoring unit according to a preferred embodiment of the present invention.
Figure 2:
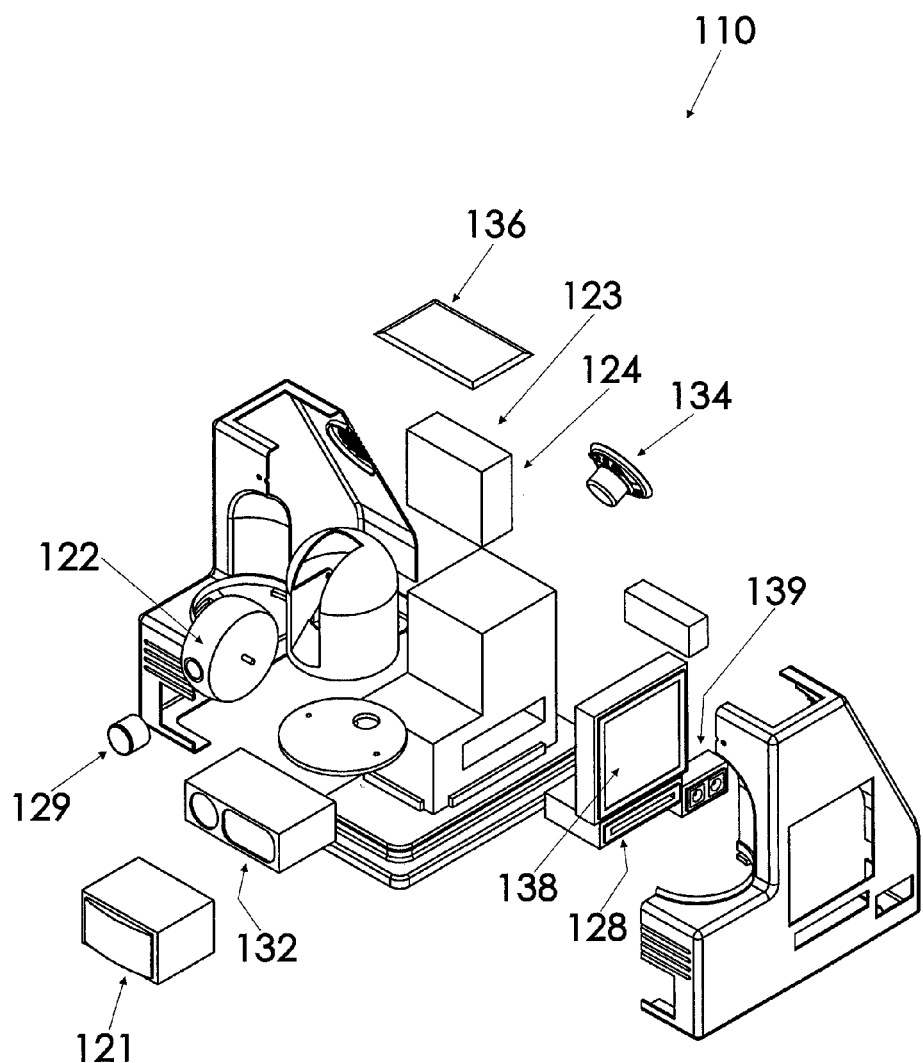
Figure 3:
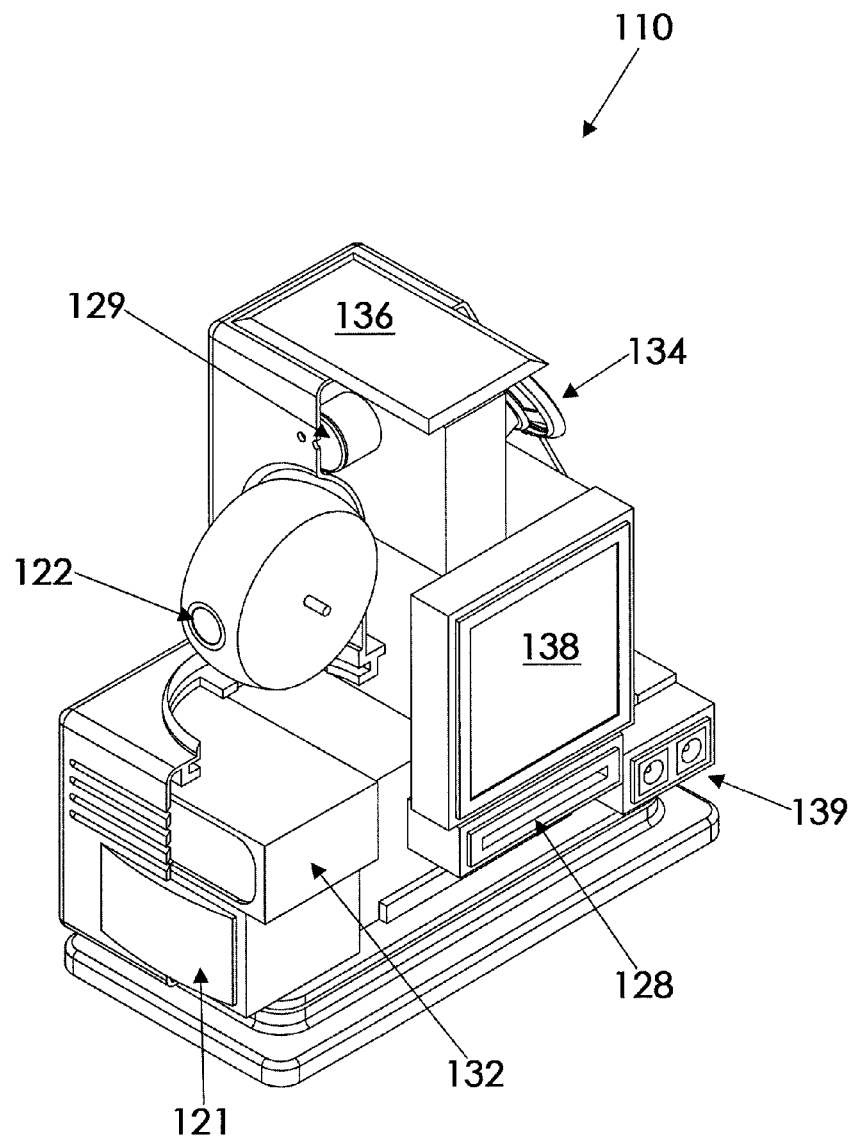
FIG. 3 is another perspective view of the monitoring unit as in FIG. 1a with the outer casing removed.
Figure 4:
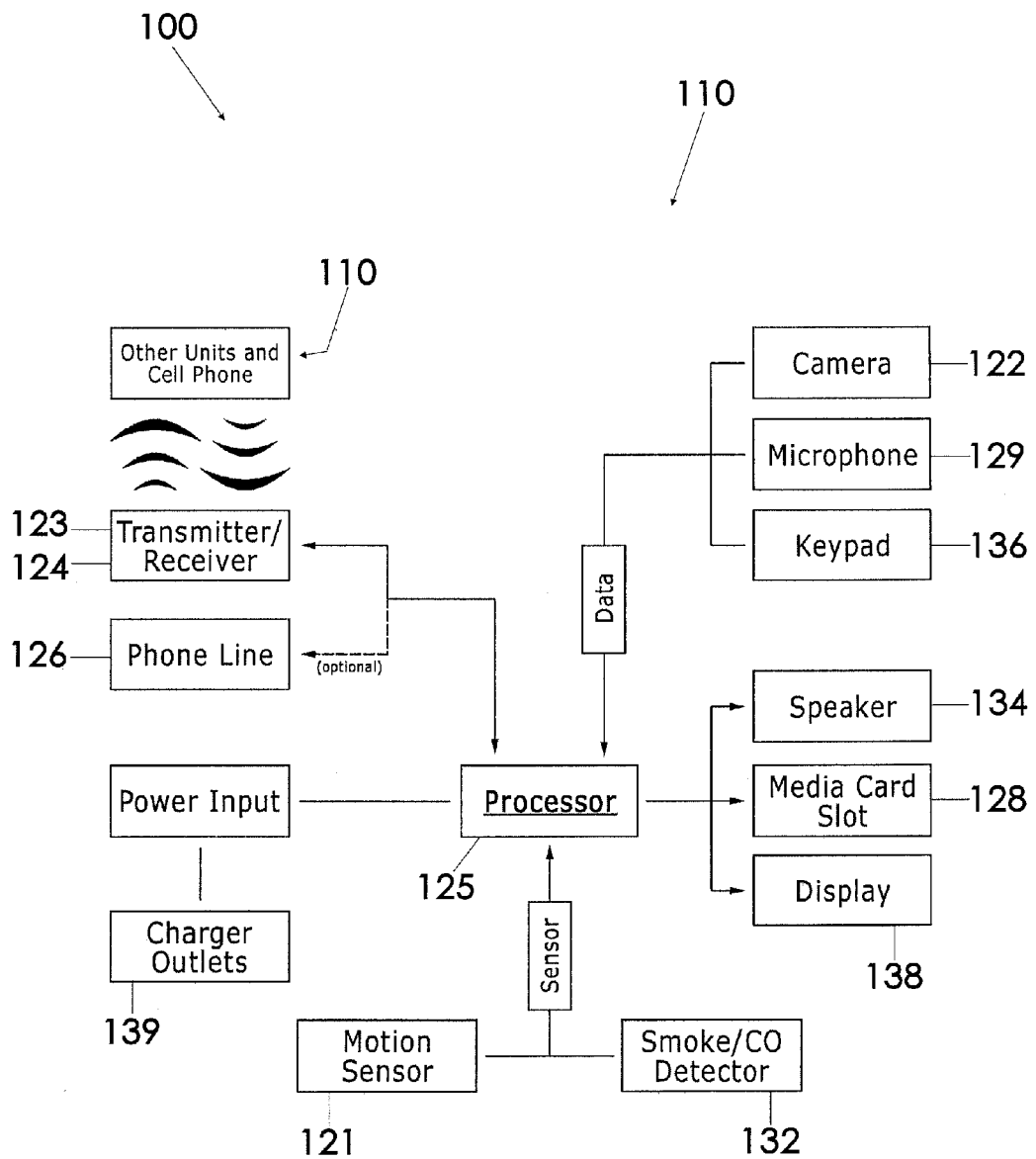
FIG. 4 is a block diagram of the components of the security system according to the present invention.

Each monitoring unit 110 has a motion sensor 121 for detecting motion, a camera 122 for obtaining visual data, a transmitter 123, a receiver 124, and a processor 125 (FIGS. 2 and 4). The processor 125 is in data communication with the motion sensor 121, the camera 122, the transmitter 123, and the receiver 124. At least one monitoring unit 110 may include a microphone 129 for obtaining audio data, as shown in FIG. 4. If a microphone 129 is included, audio data may be treated in generally the same manner as visual data, discussed in more detail below.

Means may be included for outputting the visual data from the camera 122 of the monitoring unit 110 that detects motion most recently with a respective motion sensor 121. Outputting may include, for example, providing respective visual data to a common recording device, providing respective visual data to a telephone having a display, and/or providing respective visual data to a monitoring location having a display. As shown in FIG. 4, the first monitoring unit 110 may have a telephone interface 126 in data communication with the first unit processor 125. The interface 126 may be a phone line as shown in FIG. 4, or the interface 126 may be wireless (such as using cellular or digital phone technology). The means for outputting may include, for example, programming in each respective processor 125 for actuating the camera 122 associated with the processor 125 when the motion sensor 121 associated with the processor 125 detects motion; programming in each second monitoring unit processor 125 for actuating the transmitter 123 associated with the respective processor 125 to transmit the visual data from the respective second monitoring unit camera 122 to the first monitoring unit receiver 124; programming in the first monitoring unit processor 125 for actuating the interface 126 to send the visual data from the first monitoring unit camera 122; programming in the first monitoring unit processor 125 for actuating the interface 126 to send the visual data from the second monitoring unit camera 122 received by the first monitoring unit receiver 124; programming in the first monitoring unit processor 125 for determining which monitoring unit motion sensor 121 detects motion the most recently; and programming in the first monitoring unit processor 125 for outputting the visual data from the camera 122 of the monitoring unit 110 that detects motion most recently with a respective motion sensor 121.

In addition to the visual data outputted as discussed above, additional visual data may be stored. More particularly, each monitoring unit 110 may have a memory device 128 in data communication with a respective processor 125, and each processor 125 may include programming for storing the visual data from the camera 122 associated with the processor 125 in the respective memory device 128. FIG. 4 shows a removable memory device 128, though a hard drive or any other appropriate form of data memory may be used. Alternately, only the camera 122 of the monitoring unit 110 that detects motion most recently with a respective motion sensor 121 may be activated; all other cameras 122 may be deactivated so there is no additional visual data. More particularly, each processor 125 may include programming for actuating the transmitter 123 of the respective monitoring unit 110 to transmit an event signal indicating that the motion sensor 121 of the respective monitoring unit 110 has sensed motion when the motion sensor 121 detects motion, and each processor 125 may include programming for deactivating the camera 122 of the respective monitoring unit 110 when the receiver 124 of the respective monitoring unit 110 receives an event signal. In use, then, when one motion sensor 121 detects motion, the camera 122 of that monitoring unit 110 is actuated, and all other cameras 122 may be deactivated; when another motion sensor 121 detects motion, the camera 122 of that monitoring unit 110 is actuated, and all other cameras 122 may be deactivated, and so on.

As shown in FIG. 4, at least one monitoring unit 110 may include an environmental hazard detector 132 (e.g., a smoke detector, a heat detector, a carbon monoxide detector, etc.) and an alarm 134 (e.g., a siren, visible alarm, etc.) in data communication with a respective processor 125. Each processor 125 in data communication with a respective hazard detector 132 and alarm 134 may include programming for actuating the alarm 134 and/or the respective camera 122 upon the hazard detector 132 sensing a hazard. If a respective camera 122 is actuated, visual data may be output as generally discussed above. Each processor 125 in data communication with a respective hazard detector 132 may additionally, or alternately, include programming for actuating a respective transmitter 123 to transmit a hazard signal upon the hazard detector 132 sensing a hazard and/or programming for actuating a respective alarm 134 upon receiving a hazard signal from another monitoring unit 110 via a respective receiver 124. A respective hazard detector 132, of course, may be in data communication with a telephone interface as well.

Means may be included for the first unit processor 125 to receive remote command data (e.g., data instructing a component of the system 100 to act in a certain way). For example, the first unit processor 125 may include programming for receiving command data from the telephone interface 126. The first unit processor 125 may further include programming for actuating the first unit transmitter 123 to send the command data to the second unit receiver(s) 124. All of the processors 125 may include programming for actuating the respective cameras 122 in accordance with the command data, and if a respective camera 122 is an adjustable camera, as shown in FIGS. 1*b*, 1*c*, and 1*d*, programming may be included for adjusting the adjustable camera 122 in accordance with the command data. The first unit processor 125 may further include programming for outputting (e.g., using the telephone interface 126 as discussed above) the visual data obtained from the respective cameras 122 in accordance with the command data.

Each monitoring unit 110 may include an input device 136 and/or a display 138 in data communication with a respective processor 125 for controlling functionality of the respective processor 125, such as by selecting functions to be performed, actuating the respective processor 125 in accordance with a timer, entering a number for the telephone interface 126, etc. A power outlet 139 may also be included with at least one monitoring unit 110. The power outlet 139 may be a conventional 110 volt power outlet, or the power outlet 139 may have a different output for charging a computer or cellular telephone, for example.

It is understood that while certain forms of this invention have been illustrated and described, it is not limited thereto except insofar as such limitations are included in the following claims and allowable functional equivalents thereof.

What is claimed is:

1. A security system, comprising:
   a first monitoring unit having:
      a motion sensor for detecting motion;
      a camera for obtaining visual data;
      a transmitter;
      a receiver; and a processor in data communication with said motion sensor, said camera, said transmitter, and said receiver;
an input device in communication with said processor that is configured to enable a user to select functions to be performed by said processor;
a display in data communication with said processor that is configured to display data indicative of said operations to be performed by said processor;
a second monitoring unit having:
a motion sensor for detecting motion;
a camera for obtaining visual data;
a transmitter;
a receiver; and
a processor in data communication with said motion sensor, said camera, said transmitter, and said receiver;
an input device in data communication with said processor that is configured to enable a user to select operations to be performed by said processor;
a display in data communication with said processor that is configured to display data indicative of said operations to be performed by said processor;
programming in said first unit processor for actuating said first unit camera when said first unit motion sensor detects motion;
programming in said second unit processor for actuating said second unit camera when said second unit motion sensor detects motion;
programming in said second unit processor for actuating said second unit transmitter to transmit said visual data from said second unit camera to said first unit receiver;
programming in said first unit processor for determining if said first unit motion sensor detects motion more recently than said second unit motion sensor detects motion;
programming in said first unit processor for outputting said visual data from said first unit camera when said first unit motion sensor detects motion more recently than said second unit motion sensor detects motion;
programming in said first unit processor for outputting said visual data from said second unit camera when said second unit motion sensor detects motion more recently than said first unit motion sensor detects motion;
means for said first unit processor to receive remote command data;
programming in said first unit processor for actuating said first unit transmitter to send said command data to said second unit receiver;
programming in said first unit processor for actuating said first unit camera in accordance with said command data;
programming in said second unit processor for actuating said second unit camera in accordance with said command data; and
programming in said first unit processor for outputting said visual data obtained from said first and second unit cameras in accordance with said command data;
wherein:
said first unit has a telephone interface in data communication with said first unit processor;
outputting comprises actuating said telephone interface to send said visual data to a telephone having a display;
said first unit processor includes programming for receiving command data from said telephone interface;
said first unit processor includes programming for actuating said telephone interface to send said visual data obtained from said first and second unit cameras in accordance with said command data;
wherein:
said first unit camera is an adjustable camera;
said second unit camera is an adjustable camera;
said first unit processor includes programming for adjusting said first unit camera in accordance with said command data;
said second unit processor includes programming for adjusting said second unit camera in accordance with said command data;
wherein:
said first unit processor includes programming for actuating said first unit transmitter to transmit an event signal indicating said first unit motion sensor has sensed motion when said first unit motion sensor detects motion;
said second unit processor includes programming for actuating said second unit transmitter to transmit an event signal indicating said second unit motion sensor has sensed motion when said second unit motion sensor detects motion;
said first unit processor includes programming for deactivating said first unit camera when said first unit receiver receives said second unit event signal;
said second unit processor includes programming for deactivating said second unit camera when said second unit receiver receives said first unit event signal;
wherein:
said first unit includes an environmental hazard detector in data communication with said first unit processor;
said first unit includes an alarm in data communication with said first unit processor;
said second unit includes an environmental hazard detector in data communication with said second unit processor;
said second unit includes an alarm in data communication with said second unit processor;
said first unit processor includes programming for actuating said first unit alarm upon said first unit hazard detector sensing a hazard;
said first unit processor includes programming for actuating said first unit transmitter to transmit a hazard signal upon said first unit hazard detector sensing a hazard;
said second unit processor includes programming for actuating said second unit alarm upon said second unit hazard detector sensing a hazard;
said second unit processor includes programming for actuating said second unit transmitter to transmit a hazard signal upon said second unit hazard detector sensing a hazard;
said first unit processor includes programming for actuating said first unit alarm upon said first unit receiver receiving a hazard signal; and
said second unit processor includes programming for actuating said second unit alarm upon said second unit receiver receiving a hazard signal.

2. The system as in claim 1, wherein:
said first unit has a memory device in data communication with said first unit processor;
said second unit has a memory device in data communication with said second unit processor;

said first unit processor includes programming for storing said visual data from said first unit camera in said first unit memory device; and said second unit processor includes programming for storing said visual data from said second unit camera in said second unit memory device.

3. The system as in claim 1, wherein said outputting includes at least one of:

providing respective visual data to a common recording device;

providing respective visual data to a telephone having a display; and providing respective visual data to a monitoring location having a display.

* * * * *